Feb. 10, 1942. A. J. GRANBERG ET AL 2,272,170
FLUID METER
Filed Dec. 4, 1939 5 Sheets-Sheet 1

INVENTORS
ALBERT J. GRANBERG.
BY THOMAS A. McCOY
Lippincott + Metcalf
ATTORNEYS.

Feb. 10, 1942.   A. J. GRANBERG ET AL   2,272,170
FLUID METER
Filed Dec. 4, 1939   5 Sheets-Sheet 3

INVENTORS
ALBERT J. GRANBERG.
THOMAS A. McCOY
BY Lippincott & Metcalf
ATTORNEYS.

Feb. 10, 1942.  A. J. GRANBERG ET AL  2,272,170
FLUID METER
Filed Dec. 4, 1939  5 Sheets-Sheet 4

INVENTORS
ALBERT J. GRANBERG.
THOMAS A. McCOY
BY Lippincott & Metcalf
ATTORNEYS.

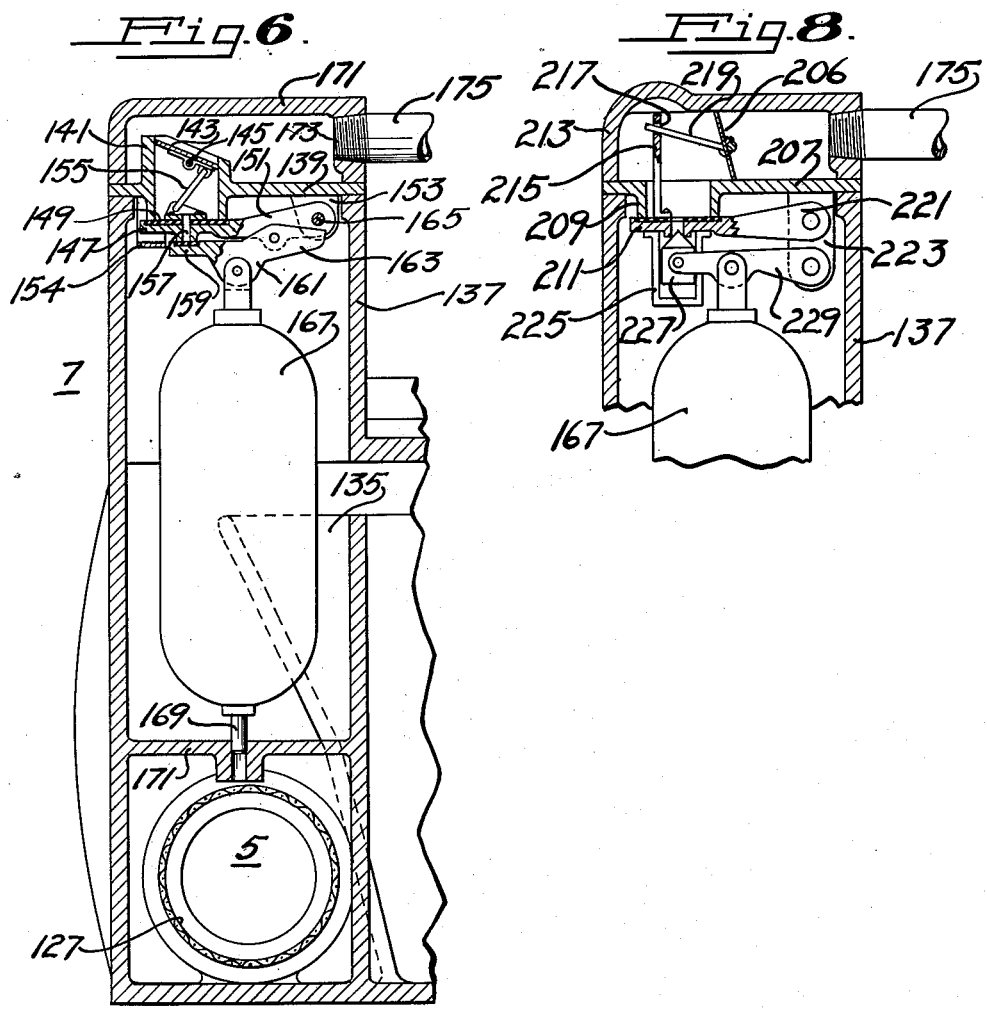
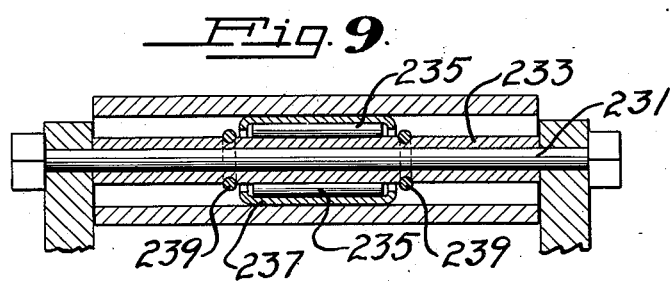

Patented Feb. 10, 1942

2,272,170

UNITED STATES PATENT OFFICE 2,272,170

FLUID METER

Albert J. Granberg and Thomas A. McCoy, Oakland, Calif., assignors to Granberg Equipment Inc., Emeryville, Calif., a corporation of California Application December 4, 1939, Serial No. 307,430

4 Claims. (Cl. 73—253)

Our invention relates to meters and more particularly to a type of meter capable of measuring fluids such as oil, gasoline and the like.

It is an object of our invention to provide an improved meter (1) which is adjustable in either positive or negative direction to correct for inaccurate metering due to variations attributed to manufacturing tolerances, and variations in viscosity of the fluids to be metered; (2) which when once adjusted, may be sealed against unauthorized tampering; (3) which will run full at all times; (4) which will efficiently remove sediment from liquid being metered; (5) which will function with little friction and consequently without noticeable wear.

Additional objects of our invention will be discussed in the following description of the same taken in conjunction with the accompanying drawings wherein;

Figure 1 is a front elevational view of our improved meter.

Figure 2 is a view in perspective of a portion of the rotary assembly of our improved meter, showing the construction of a blade and its cooperation with associated elements of a rotor cage, included in the rotary assembly.

Figure 6 is a view in section showing the filtering and air separation features constituting important components of our meter.

Figure 8 is a modification of the valve assembly illustrated in Figure 6 as constituting a portion of the air separation feature of our improved meter.

Figure 9 is a view illustrating a modification of the rotor cage elements of Figure 2.

Figure 3:
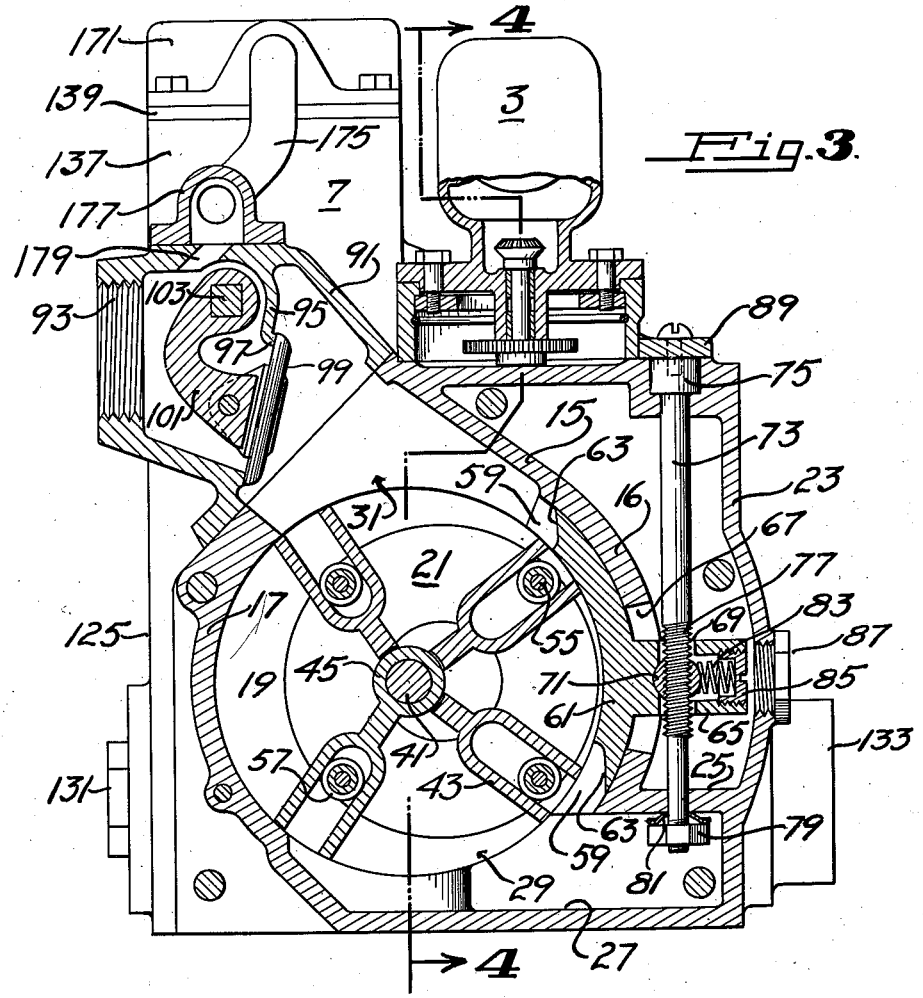
Figure 3 is an elevational view in section taken in the plane 3—3 of Figure 1.
Figure 4:
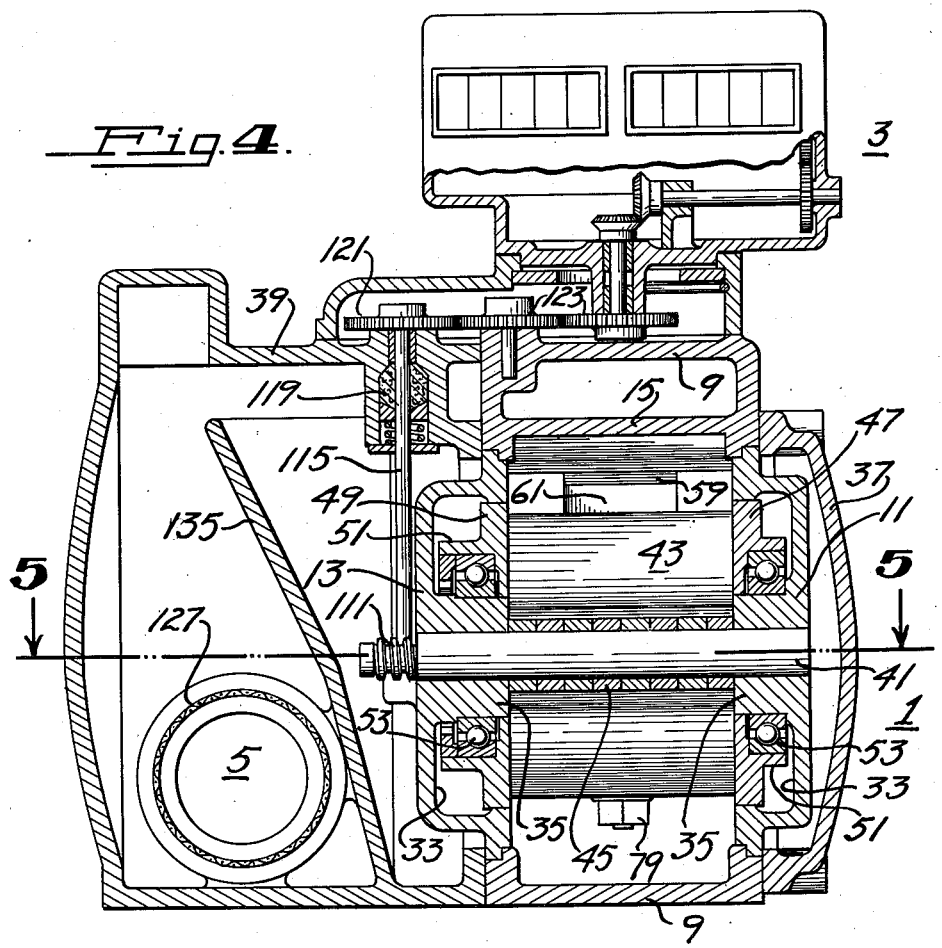
Figure 4 is an elevational view in section taken along the line 4—4 of Figure 3.
Figure 5:
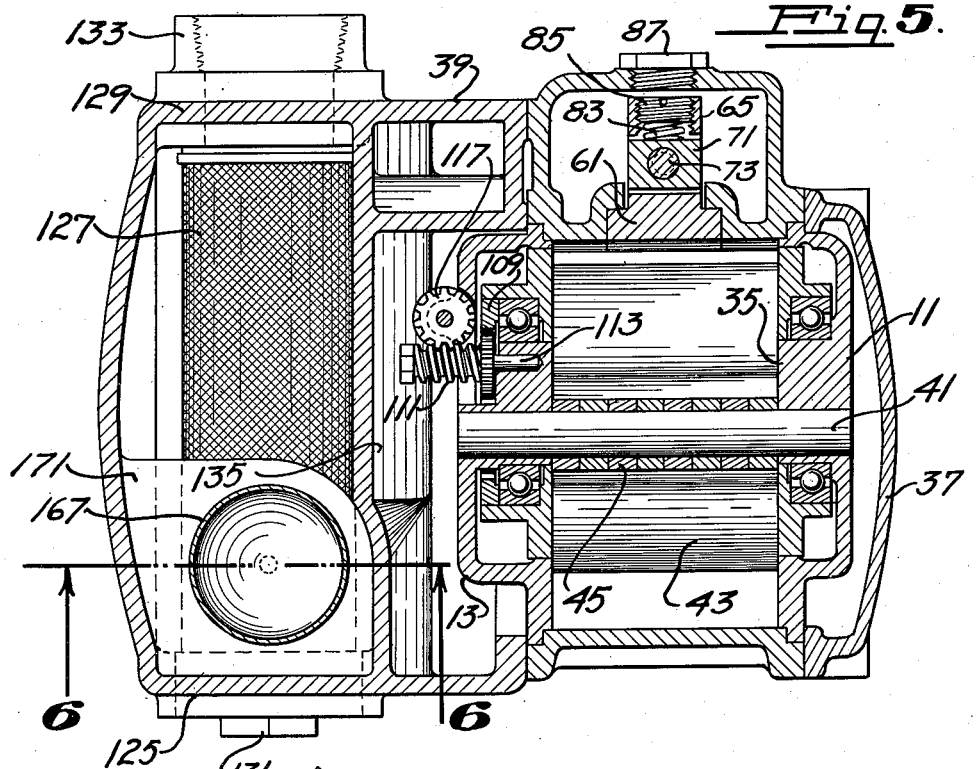
Figure 5 is a view in section taken in the plane 5—5 of Figure 4.

Our improved meter constitutes a number of component features, which may be roughly separated into the metering portion 1, the indicator 3, the filter 5 and the air separator 7, all cooperating to realize the objects for which our improved meter has been developed. These various components will be described in the order indicated.

The metering portion is housed within a casing including a center section 9 and end walls 11 and 13. The center section incorporates therein a partition wall 15 having a cylindrical portion 16 cooperating with a corresponding front wall 17 of the center section, to provide a cylindrical chamber 19 for receiving a rotary assembly 21. The partition wall connects with the rear wall 23 of the center section by a horizontal platform section 25 spaced from the base or floor 27. This leaves an intake passage adjacent the lower edge of the rear wall leading to an opening 29 to the cylindrical chamber at the bottom thereof, and at a distance above the floor of the center section. This opening constitutes the inlet or intake opening to the metering chamber 19.

The outlet opening 31 from the chamber is located at the top thereof, substantially diametrically opposite to the intake opening, such outlet opening leading off at an angle through the upper portion of the casing in the direction of discharge at the front of the meter, and is defined in part by the aforementioned partition wall 15. The end plates 11 and 13 which together with the center section define the metering chamber 19 are groove fitted to the center section along the peripheral edges of the chamber opening through the center section.

Each end plate is formed with an eccentrically located convex cylindrically shaped off-set 33, and centrally of said off-set there is integrally formed an inwardly directed boss 35 of substantial diameter having a cylindrical surface. When assembled to the center section of the metering portion of our improved meter, the bosses 35 are in alinement and face each other. The end plate 11 is maintained in assembled position under pressure by an end cap 37 which may be suitably bolted to the assembly, whereas the other end plate 13 is maintained in its assembled position under pressure by the casing 39 of the filtering and air separation chamber to be subsequently described.

A shaft 41 extending axially of the metering chamber is anchored at each end in one of the bosses 35 and fixed therein against rotation. This shaft carries a plurality of blades 43, four in number in the embodiment under consideration, each of the blades being of tuning fork shape in cross section and having a pair of integral spaced rings 45 for rotatably mounting the same on the shaft, the rings being so spaced as to permit of the assembling of all the blades on the same shaft. Each blade is of a length equal to the radius of the metering chamber 19 and is adapted, upon rotation about the shaft, to move in close contact with the cylindrical wall surface of the metering chamber.

The blades 43 are maintained in angular relationship with respect to each other by a cage rotor. This cage rotor comprises a pair of circular end members 47 and 49 fitting within the aforementioned cylindrical off-set wall sections 33, each end member having a central opening therethrough to receive the end of one of the bosses 35 and is further provided with a concentric circular flange 51 to engage a ball race 53 surrounding each of the bosses. The end members of the cage rotor are interconnected at uniformly spaced points around their peripheries by interconnecting rods 55 having reduced ends 57 for anchoring to the end members, each rod carrying a rotatably mounted sleeve or roller 57.

The rotor cage is assembled with each interconnecting rod 55 and its associated sleeve 57 loosely fitting between the spaced portions of a blade thereby supporting the blades in angular relationship with respect to one another at all times. Such angular positioning of the blades is symmetrical with respect to one plane only; e. g., the horizontal plane in the embodiment as illustrated and positioned in the drawing. As the assembly is rotated, the cage rotates about an axis which is eccentric to the axis of the shaft 41 about which the blades 43 revolve, and as a consequence the angular space between any two blades will cyclically vary throughout each complete rotation thereof, the angular space being the greatest at the front end of the chamber and smallest at the rear end of the chamber in the embodiment as depicted in Fig. 3.

The chamber wall 16 is grooved from the outlet opening 31 to the inlet opening 29, which is the portion of the chamber wherein the angle between any two of the blades becomes a minimum. In the groove 59 thus formed, there is placed a slidable wall section or segment 61 having bevelled or tapered leading and lagging ends 63, and an integral hollow tail portion 65 extending through a slot opening 67 in the cylindrical partition wall section 16 and reaching approximately to the rear wall 23 of the center section of the metering casing.

This hollow tail portion is provided with a vertical passage 69 therethrough, and an intersecting horizontal passage, somewhat larger in diameter to receive a cylindrical bearing 71 having a vertical threaded bore axially coinciding with the vertical passage 69. An adjusting rod 73 having a slotted head 75 and a threaded intermediate portion 77 extends vertically downward through the top wall of the casing and through the horizontal platform section 25 of the partition wall 15, with the intermediate portion in threaded engagement with the threaded bore of the bearing 71. A nut 79 threaded to the end of this adjusting rod against a spring washer 81 permits rotational movement of the rod without longitudinal travel thereof. Consequently rotational movement of this adjusting rod will necessarily produce displacement of the bearing 71, and this in turn being fixed within the tail portion of the slidable wall segment 61 will necessarily bring about a sliding adjustment of the segment in the groove in either direction, depending upon the direction of rotation of the adjusting rod. A small spring 83 retained in compression between the bearing and a threaded cap closure 85 for the hollow tail portion of the adjustable wall segment, serves to eliminate any looseness which might ordinarily exist or develop between the bearing, the adjusting rod and the adjustable wall segment, whereby smoother adjustment will be realized and accurately maintained. The threaded cap closure 85 is slotted to permit adjustment of the spring pressure with a screw driver or similar tool inserted through an opening in the rear wall 23 of the casing, which opening is normally closed by means of a closure nut 87.

The slotted head 75 of the adjusting shaft fits within a socket formed in the upper or top wall of the casing, and may be rendered inaccessible against unauthorized tampering of the metering adjustment by means of a cap 89 bolted against the upper or top wall over the head of the adjusting rod and sealed in any customary manner.

The discharge from the metering chamber occurs through a discharge nozzle 91 which constitutes a continuity of discharge passage from the outlet opening 31, the nozzle terminating in an interiorly threaded mouth 93 to receive a hose coupling or the like. The nozzle is provided with a partition wall 95 at an intermediate point, having an opening therethrough bounded by a lip 97 to provide a valve seat for a disc type discharge valve 99. This valve is hinged for limited pivotal movement to one end of a lever 101, which in turn is rigidly fixed to a square shaft 103 extending exteriorly of the discharge nozzle through a wall thereof. A manual control lever 105 is securely fixed to the exterior or protruding end of the square shaft and is normally retained in an upward position against a suitable stop 107 by the weight of the valve and valve lever within the nozzle.

The rotation of the rotatable assembly within the metering chamber is measured and indicated on the counter or indicator 3 supported on top of the metering chamber. An internal ring gear 109 is fixed within the circular flange 51 of the end plate 49 and this meshes with a pinion and worm combination 111, which extends through the end wall 13 and is freely rotatable about a stub shaft 113 anchored to the end plate. The worm, in turn, drives a vertical shaft 115, through a pinion 117 fixed to the lower end thereof, the shaft extending through a packing gland 119 in the upper wall of the filter casing, and carrying at its protruding end a gear 121. This gear drives through a suitable gear train 123 to the indicator. The indicator may be of any adaptable type and a detail description of the type illustrated is not essential to an understanding of the invention.

The drive from the rotary assembly to the indicator, however, is designed to a precalculated speed ratio so that the indicator will correctly indicate the volume of liquid passing through the metering chamber. This takes into account the capacity of the rotary assembly per revolution, which is preferably designed to pass a gallon of liquid per whole number of revolutions, at a mean setting of the adjustment.

The filter and air separator are housed within a separate casing 39 which abuts against the casing that houses the metering portion, and as previously indicated, serves to hold the end plate 13 in its assembled position. The filter and air separator casing has an opening in its front wall 125 adjacent the floor of the casing, such opening being of sufficient diameter to permit of the insertion and withdrawal of a cylindrical filter unit 127. This filter extends the full distance between the front wall 125 and rear wall 129 of this casing and is normally closed at the opening through which it is inserted, by a closure nut 131 threaded into the opening. The rear wall of the casing at a point opposite the opening in the front wall, is formed with a tubular extension 133 of somewhat smaller diameter than the filter unit. This tubular extension is threaded internally to receive a hose coupling and constitutes the input opening to the meter.

Intermediate the filter unit and the metering chamber or more particularly the end wall 13 of the metering chamber, there is provided a baffle wall 135 the full depth of the casing and extending from the floor thereof to a point above the level of the upper limit of the metering chamber.

The casing is further provided with an upwardly extending open ended section 137 at the front end thereof to provide a chamber space for a float and valve assembly immediately above the filter. The valve assembly is supported by a horizontal partition 139 spanning the upper edges of the casing extension. This horizontal partition is formed with an integral tubular wall 141 extending above and below the plane of the partition around an opening therethrough. The upper end of this tubular wall slopes downwardly in the general direction of the metering portion of the meter. This end is normally closed by a butterfly valve 143 pivotably supported upon a pin 145 extending through diametrically opposite points of this tubular wall.

The lower end of the tubular wall constitutes a valve seat for a flat surfaced valve 147 having resilient sealing insert 149. This valve is located at the end of a lever 151 which is pivoted at its far end to a boss 153 depending from the partition, and is limited in its movement by a valve stop 154 suspended from the partition 149. A link 155 interconnects this flat surfaced valve 147 with the butterfly valve 143 so that any movement of the flat valve away from its seating position will bring about the simultaneous opening of the butterfly valve, whereby both ends of the passage formed by the tubular wall will be open at the same time.

The flat surfaced valve has a small opening 157 therethrough interconnecting the float chamber with the chamber formed by the flat surfaced valve and the butterfly valve in their closed positions. This interconnecting opening is adapted to be closed by a smaller valve 159 which is located at the end of a separate lever 161 that is pivoted at an intermediate point to an intermediate point of the lever 151 which supports the flat surfaced valve. The small valve lever is formed with a tail extension 163 terminating below the pivot pin 165 about which the lever 151 is pivoted. With all three valves in their closed positions, the tail extension is slightly spaced from the pivot pin as illustrated in Fig. 6.

A float 167 is pivotably suspended from a point on the small valve lever 161 intermediate the small valve 159 and the point at which its associated lever is pivoted. At its lower extremity the float is provided with a guide finger 169, slidably engaging a perforation through a transverse wall section 171 between the float and the filter.

The valve assembly partition 139 is retained in position on the supporting edges of the float chamber extension by a cap 171 which may be bolted to the chamber extension, and has an opening 173 in the wall thereof facing in the direction of the discharge nozzle 91 of the meter. A pipe 175 threadedly engaging this opening, extends into a fitting 177 mounted on the upper surface of the discharge nozzle, which fitting provides a small chamber in communication with the interior of the nozzle adjacent the mouth thereof, through an interconnecting passage 179 formed in the nozzle wall.

Figure 7:
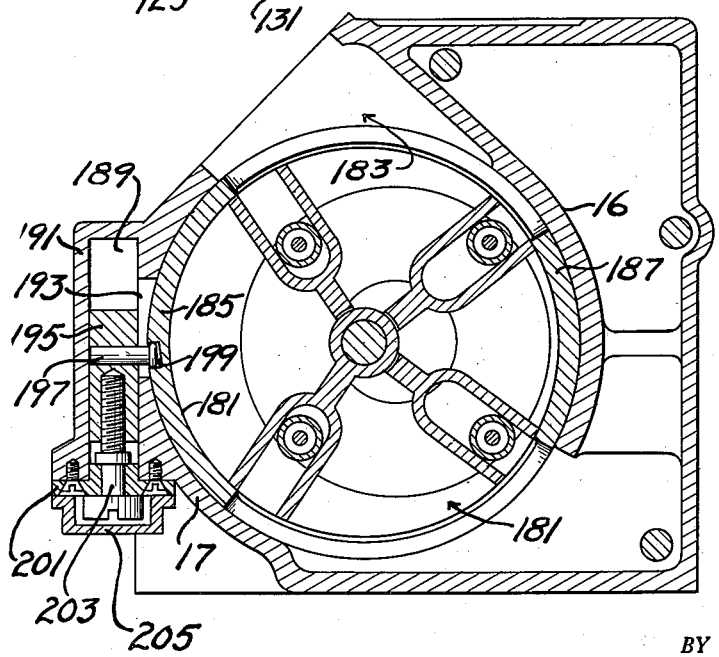
Figure 7 is a view in section showing a modification of the metering assembly illustrated in Figure 3.

In Figure 7 there is disclosed a modification of the metering chamber and adjusting means of Figure 3. A cylindrical shell 181 is rotatably fitted within the metering compartment formed by the front wall 17 and partition wall 16 of the metering casing. This cylindrical shell has an inlet opening 181 and an outlet opening 183 therethrough approximately diametrically opposite each other leaving solid wall sections 185 and 187 at the front and rear portions of the chamber. The front wall section 185 is of a length sufficient to span a compartment when at its maximum, whereas the rear wall section is of a length just sufficient to span a compartment when at its minimum. The cylindrical shell is rotatable through an angle by adjusting means housed within a small compartment 189 formed by an extension 191 to the front wall of the chamber casing and acting through an opening 193 in such front wall.

Such adjusting means comprises a block 195 slidably receivable within the casing extension compartment and having a pin 197 fixed therein and extending through the opening in the front wall of the casing and pivotally engaging a depression 199 formed in that portion of the front wall section of the cylindrical shell which is exposed through the opening 193. The casing extension is provided with a cap 201 having a threaded bolt 203 extending therethrough and rotatably mounted therein, the threaded portion of the screw being threaded into the block 195. The screw head is enclosed by a head cap 205 anchored or otherwise sealed to the screw mounting cap 201 to prevent unauthorized tempering with the adjusting screw.

In Figure 8, I have disclosed a modification of the valve assembly of Figure 6 which controls the exhausting of the air from within the float chamber. In this modification, the transverse partition 207 spanning the upper edges of the float chamber, has a cylindrical wall 209 depending therefrom, the lower edge of which constitutes a seat for a flat valve 211 in much the same manner as in the embodiment of Figure 6. This modification lacks the upper extending cylindrical wall 141 which in the embodiment of Figure 6 is closed by the butterfly valve 143. In lieu of such construction, the butterfly valve 206 in Figure 8 closes the passage formed by the partition 207 and a cap 213 which is bolted or otherwise fixed to the upper edges of the float chamber and serves to clamp the partition 207 in position.

The butterfly valve in this embodiment of the valve assembly, also is linked to the flat valve 211. This is accomplished by providing the flat valve with a rod 215 attached to the seating surface of the valve and extending upwardly through the tubular portion of the exhaust passage formed by the depending wall 209 of the partition. This rod is provided with an opening 217 adjacent its extremity, into which extends a lever arm 219 connected at one end to the butterfly valve at its pivot axis. Like in Figure 6, the flat valve 211 is carried at one end of a lever 221 which is pivoted to an arm 223 depending from the partition 207.

The valve has affixed thereto a cage 225 depending from its undersurface. A needle valve 227 is pivotably mounted on the end of a lever 229 which in turn is pivoted to the depending arm 223 below the pivot axis of the lever 221 associated with the flat valve. The float is pivotably suspended from this needle valve lever 229 at an intermediate point thereon.

A further modification of the structure of the meter of Figure 3 is to be found in Figure 9. This relates to an improvement in the roller bearing construction associated with the interconnecting bars of the rotor cage. In this embodiment, the interconnecting bar may be similar to that originally described or it may constitute a rod 231 of uniform diameter throughout having a spacing sleeve 233 mounted thereon to accurately determine the spacing between the end walls of the cage. This sleeve at its mid section is surrounded by a plurality of rollers 235 of small diameter, which are retained in position by a roller bearing casing 237 having its ends turned in to hold the rollers in position against lateral displacement. The entire roller bearing is retained at the mid section of the sleeve by means of ring clips 239 which have been sprung into circumferential grooves provided about the sleeve adjacent each end of the roller bearing.

In operation of the meter of Figure 1, the liquid to be metered is supplied to the meter under pressure at the intake opening 133 thus causing all the liquid so supplied to pass through the filter 127 and rise in the float chamber until the liquid reaches the upper edge of the baffle wall 135 at which time the liquid will spill over into the inlet passage extending adjacent the lower edge of the rear wall of the metering portion of the meter, and enter the metering chamber through the inlet opening 29. Inflowing liquid striking the blades in succession will cause rotation in a clockwise direction (Figure 3) of the entire rotatable assembly within the metering chamber, providing the valve 99 is manually held in open position by means of the hand control lever 105. During such clockwise rotation of the assembly, the amount of liquid taken up by each compartment will be determined by the angular spacing between the two blades of each compartment at the instant two adjacent blades are sealed on segment 61. A certain portion of the liquid taken up by the sealed compartment in passing the outlet opening will be trapped to be subsequently carried back to the inlet portion of the chamber. The amount of liquid therefore which is discharged from each compartment during rotation will be the difference between the amount of liquid so taken up and the amount which is returned, and this difference is forced out through the discharge nozzle by reason of the fact that the compartment under consideration is gradually reduced in angular dimension as the blades which determine such compartment are rotated past the discharge opening to their position determining minimum angular spacing between the two. The discharge from the meter is recorded in terms of gallons or other desirable units upon the indicating mechanism 3 supported upon the top of the metering section of the meter.

To better understand the adjustment feature which constitutes an essential part of our invention, it will be assumed that the well segment 61 is initially installed to be symmetrical with respect to the horizontal through the axes of the rotatable assembly. In this position the adjacent blades sealed by segment 61 are at their minimum spacing. The meter will have a maximum output per rotation of the metering assembly under these conditions because there will be minimum take-back. However, as previously indicated the meter is designed to record a full gallon output, for example, per whole number of revolutions so the segment 61 is moved counterclockwise to a mean setting, which determines a value of capacity for the meter approximately halfway between its maximum and minimum capabilities. Now should it be found that due to manufacturing tolerances or change in viscosity the amount of liquid which the meter actually passes does not agree with the reading of the counter or indicator, the capacity of the meter can then be adjusted to agree with the indicator by manipulation of the adjusting rod 73 in the proper direction, depending upon whether the capacity of the meter is below or above the proper value. When rotated in one direction, the segment will move upward to effectively increase the take-back from the output chamber as the compartment sealed by segment 61 will be slightly larger. When the adjustment of the wall segment 61 is in the opposite direction, that is toward the inlet opening the compartment sealed by segment 61 will be slightly smaller, decreasing the take-back. Under such an adjustment the meter output will be increased.

In the meantime during operation of the meter, the rise of liquid in the float chamber to the upper edge of the baffle wall will lift the float, causing the same to close the valves in the upper portion of the float chamber, and any air which escapes from the inflowing liquid will rise in the upper portion of the float chamber and collect there under pressure.

Following the completion of a metering operation when the flow of fluid is halted, the rotary assembly in the metering chamber will remain submerged in liquid by reason of the presence of the baffle wall which will maintain a liquid level above the upper limits of the metering chamber, but the fluid in the float and filter chamber which is not controlled by the baffle will drain out of the meter and permit the float to steadily drop in position. Inasmuch as the pressure within the float chamber is substantially greater than the atmosphere pressure existing within the cap which encloses the valve assembly, considerable weight would ordinarily be required to satisfactorily open a valve such as the flat valve 147 of Figure 6 against the differential pressure existing on both sides thereof. Opening of the float chamber to the atmosphere is greatly facilitated in our improved meter, by the valve assembly disclosed by us in Figure 6, which permits of the use of any standard float, as the assembly requires but little weight to overcome such difference in pressure. In this valve assembly the butterfly valve and the large flat valve together with the cylindrical wall in the partition, consitute a small intermediate chamber whose connection with the interior of the float chamber is closed by a small valve. Inasmuch as the amount of effort required to open a small valve is materially less than that required for a valve having a larger exposed surface area, the area of the small valve may be such as to permit it to be readily opened by the weight of the float as the liquid level in the float chamber drops. This will immediately permit escape of air from the float chamber into the small intermediate chamber, thereby enabling a rapid approach toward equalization or substantial equalization of pressure on both sides of the large flat valve, to such an extent as to facilitate the opening of this larger valve with little effort. Such effort of course is supplied by the float itself, acting through the small valve lever, which at this time engages the pivot pin of the larger valve lever.

By reason of the link connection between the large flat valve and the butterfly valve, opening of the large valve will bring about simultaneous opening of the butterfly valve thus establishing the desired communication to the atmosphere from the float chamber, and enabling the air trapped in the float chamber to escape rapidly through the discharge nozzle via the connecting pipe 175.

The valve assembly of Figure 8, though it differs somewhat in the construction from that of Figure 6, nevertheless operates upon the same principle. The large flat valve and the butterfly valve together determine an intermediate chamber in the discharge passage to the atmosphere from the float chamber. A small opening from this intermediate chamber to the interior of the float chamber is closed by the needle valve. Upon a drop in the fluid level in the float chamber, the needle valve is opened thereby reducing the differential pressure existing on both sides of the large flat surfaced valve. The needle valve in its opening movement, strikes against the bottom of the cage in which it rides, thus transferring the weight of the float to the large valve causing the same to open. Such opening of the larger valve brings about simultaneous opening of the butterfly valve by reason of the interconnecting linkage between the two, thereby opening the passage from the interior of the float chamber to the atmosphere.

Now directing attention to the adjusting means of Figure 7, it is noted that while the adjusting means of Figure 3 involves adjustment of the discharge only of the meter, that in Figure 7 provides for the simultaneous adjustment of both the intake and the discharge of the metering assembly.

Looking at the device of Fig. 3 first, it can be seen that if segment 61 is so positioned that the liquid trapped between two blades, both of which are contacting segment 61, is the minimum that can be contained in the compartment between the blades, then the take-back from the outlet side of the meter to the inlet is at a minimum. This will occur with the segment 61 so positioned as to contact adjacent blades at their minimum approach. It will, of course, be obvious that in this position the overlap of the blades on segment 61 should be only the maximum necessary to allow for the desired arcuate adjustment of the segment. In this regard, a physical embodiment of the meter shown in Fig. 3 works well with a maximum blade-segment overlap of from .040 to .050 inch.

As segment 61 is moved counter-clockwise it will seal the spaces between the adjacent blades, when the blades are slightly further apart, thus increasing the take-back and decreasing the output of the meter. The mean setting of segment 61, therefore, will be between the maximum upward travel of segment 61 and the position where segment 61 registers with the minimum spacing of the blades. The maximum upward position of the segment is determined by the approach to the point where no overlap occurs of both adjacent blades on segment 61. We have found that in the physical embodiment referred to above, the minimum overlap may be as low as from .002 to .010 inch to maintain a seal. In the same physical embodiment, such a shift in overlap between maximum and minimum values would allow a segment adjustment over approximately 30°. This movement of 30° will give a change in capacity of the meter of approximately 3.4 per cent, this change being ample to accommodate all necessary adjustments of the output to give an exact desired measurement. Lesser percentage change may be used in many installations.

In the device shown in Fig. 7, where segments 187 and 185 are both moved, the operation is similar, except that both the carry-over and the take-back are changed by adjustment, the carry-over being made less and the take-back made more by a single adjustment. This, of course, means that the segments need only be moved over a lesser arc than in the device of Fig. 3. Movement over an arc of 10° may be required to give a 3.4 per cent adjustment and in this case, of course, the maximum overlap is greatly reduced. The minimum overlap can be held to .002 to .005 inch and the maximum overlap need only be from .010 to .020 inch for the same change in capacity as for maximum overlap of .040-.050 inch in the single segment device.

In all the embodiments shown, therefore, it will be seen that the maximum overlap of adjacent blades on a segment need only be of the order of .050 inch. While it is true that adjacent blades have some relative motion while the space between them is sealed by segments 61, 187, or 185, this change in space is relatively small and the incompressibility of the liquid does not cause the meter to jam. All meters of this type will, however, give a slight knock or thump when adjacent blades are both passing over the sealing segments, and this thump is due to the take-up of clearances in the bearings connecting the two blades. This additive bearing clearance, for example, includes clearances in the contacts between rollers 57 and arms 43, the contacts between rollers 57 and rods 55 and the clearances in the bearings 45 on shaft 41. These clearances are sufficient to prevent jamming of the meter during the almost instantaneous sealing period. Likewise, these additive clearances are such as to allow the adjustment of take-back in the device shown in Fig. 3 or of both carry-over and take-back as shown in Fig. 7, while the meter is running without jamming, because when the meter can operate with the maximum overlap of the blades during the sealing travel, then thumping will be less at all other adjustments.

Furthermore, it is easily possible to design the meter so that the sealing thumps occur at different points of rotation for the two opposite segments, thus preventing additive opposition to rotation. The device of Fig. 3, for example, will, when the segment 61 is out of minimum carry-over position, never seal opposite, adjacent pairs of blades at the same time.

From a practical standpoint, it has been found that meters as shown and described will operate and rotate freely, even when the maximum sealing overlap occurs. It is obvious, however, that the maximum overlap cannot be indefinitely increased without jamming. We have found, however, that the meters will run freely with an overlap sufficient to give accurate adjustment within any practical desired range.

It will be apparent from the above description of our improved meter and modifications thereof, that the same will produce results fulfilling the objects of our invention as previously set forth. Our invention is susceptible to other modifications and embodiments without departing from the scope thereof, and we accordingly do not desire to be limited in our protection to the specific details illustrated and described above, except as may be necessitated by the appended claims.

We claim:

1. A meter having a cylindrical casing having an inlet on one side and an outlet at the other side, and having opposite casing segments forming inner bearing surfaces between inlet and outlet openings, a stationary shaft within said casing, said shaft being carried by opposite end walls of said casing, said end walls each having an annular recess therein opening into the interior of said casing and eccentrically located around said shaft, a ring in each recess and bearing on the adjacent end wall, vanes mounted on said shaft for pivotal and rotational movement thereon, said vanes contacting the inner peripheral walls of said casing segments between inlet and outlet openings, pins connecting said rings to form a solid cage thereof, bearings between said pins and said vanes for rotation of said cage with said vanes, a ring gear mounted to rotate with one of said rings inside of the end wall carrying said latter ring, gearing means passing through said latter end wall and meshing with said ring gear, registering means outside of said end wall driven by said gearing means, the casing segments contacted by adjacent vanes during rotation being of sufficient arcuate extent to seal adjacent blades between both inlet and outlet openings, at least one of said segments being arcuately movable with respect to the remainder of the casing, and means for moving said segment from outside of the casing.

2. A meter having a cylindrical casing having an inlet on one side and an outlet at the other side, and having opposite casing segments forming inner bearing surfaces between inlet and outlet openings, a stationary shaft within said casing, said shaft being carried by opposite end walls of said casing, said end walls each having an annular recess therein opening into the interior of said casing and eccentrically located around said shaft, a ring in each recess and bearing on the adjacent end wall, vanes mounted on said shaft for pivotal and rotational movement thereon, said vanes contacting the inner peripheral wall of said casing segments between inlet and outlet openings, pins connecting said rings to form a solid cage thereof, bearings between said pins and said vanes for rotation of said cage with said vanes, a ring gear mounted to rotate with one of said rings inside of the end wall carrying said latter ring, gearing means passing through said latter end wall and meshing with said ring gear, registering means outside of said end wall driven by said gearing means, the casing segments contacted by adjacent vanes during rotation being of sufficient arcuate extent to seal adjacent blades between both inlet and outlet openings, the segment left by the vanes moving into said outlet being arcuately movable with relation to the remainder of the casing, and means for moving said segment from outside of the casing.

3. A meter having a cylindrical casing having an inlet on one side and an outlet at the other side, and having opposite casing segments forming inner bearing surfaces between inlet and outlet openings, a stationary shaft within said casing, said shaft being carried by opposite end walls of said casing, said end walls each having an annular recess therein opening into the interior of said casing and eccentrically located around said shaft, a ring in each recess and bearing on the adjacent end wall, vanes mounted on said shaft for pivotal and rotational movement thereon, said vanes contacting the inner peripheral walls of said casing segments between inlet and outlet openings, pins connecting said rings to form a solid cage thereof, bearings between said pins and said vanes for rotation of said cage with said vanes, a ring gear mounted to rotate with one of said rings inside of the end wall carrying said latter ring, gearing means passing through said latter end wall and meshing with said ring gear, registering means outside of said end wall driven by said gearing means, the casing segments contacted by adjacent vanes during rotation being of sufficient arcuate extent to seal adjacent blades between both inlet and outlet openings, both of said segments being arcuately movable with respect to the remainder of the casing, and means for moving said segments from outside of the casing.

4. A meter having a cylindrical casing having an inlet on one side and an outlet at the other side, and having opposite casing segments forming inner bearing surfaces between inlet and outlet openings, a stationary shaft within said casing, said shaft being carried by opposite end walls of said casing, said end walls each having an annular recess therein opening into the interior of said casing and eccentrically located around said shaft, a ring in each recess and bearing on the adjacent end wall, vanes mounted on said shaft for pivotal and rotational movement thereon, said vanes contacting the inner peripheral walls of said casing segments between inlet and outlet openings, pins connecting said rings to form a solid cage thereof, bearings between said pins and said vanes for rotation of said cage with said vanes, a ring gear mounted to rotate with one of said rings inside of the end wall carrying said latter ring, gearing means passing through said latter end wall and meshing with said ring gear, registering means outside of said end wall driven by said gearing means, the casing segments contacted by adjacent vanes during rotation being of sufficient arcuate extent to seal adjacent blades between both inlet and outlet openings, both of said segments being arcuately and simultaneously movable with respect to the remainder of the casing, and means for moving said segments from outside of the casing.

ALBERT J. GRANBERG.
THOMAS A. McCOY.